United States Patent
Saewe et al.

(10) Patent No.: US 7,464,996 B2
(45) Date of Patent: Dec. 16, 2008

(54) METHOD FOR STABILIZING A MOTOR VEHICLE WHOSE SPEED IS REDUCED TO A REST POSITION AND BRAKE SYSTEM FOR CARRYING OUT SAID METHOD

(75) Inventors: Dirk Saewe, Polch (DE); Christoph Wagner, Reilingen (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/412,893

(22) Filed: Apr. 27, 2006

(65) Prior Publication Data
US 2006/0186732 A1 Aug. 24, 2006

Related U.S. Application Data

(63) Continuation of application No. PCT/EP2004/012153, filed on Oct. 27, 2004.

(30) Foreign Application Priority Data
Oct. 31, 2003 (DE) ................ 103 51 025

(51) Int. Cl.
*B60T 13/00* (2006.01)
(52) U.S. Cl. .................. 303/89; 303/191; 303/9.62
(58) Field of Classification Search .............. 303/89, 303/191, 9.62, 186; 188/265, DIG. 2
See application file for complete search history.

(56) References Cited

U.S. PATENT DOCUMENTS

| | | | | |
|---|---|---|---|---|
| 5,403,078 A * | 4/1995 | Farr | ................. | 303/117.1 |
| 6,019,436 A | 2/2000 | Siepker | | |
| 7,092,809 B2 * | 8/2006 | Endres | ................. | 701/70 |
| 7,140,697 B2 * | 11/2006 | Koga et al. | ................. | 303/20 |
| 2003/0214185 A1 | 11/2003 | Kinder et al. | | |
| 2006/0186731 A1 * | 8/2006 | Bach | ................. | 303/89 |

FOREIGN PATENT DOCUMENTS

| | | |
|---|---|---|
| DE | 100 63 063 A1 | 6/2002 |
| EP | 0 825 081 A1 | 2/1998 |
| FR | 2 838 091 A1 | 10/2003 |
| WO | WO 02/46007 A1 | 6/2002 |

* cited by examiner

*Primary Examiner*—Bradley T King
(74) *Attorney, Agent, or Firm*—MacMillan, Sobanski & Todd, LLC

(57) ABSTRACT

In a method for stabilising a motor vehicle which is decelerated into a rest position and in a corresponding motor vehicle brake system which is provided with a service brake and a parking brake which can be actuated independently of the driver, when activation of the parking brake is initiated, the service brake changes from a first braking-force distribution of a service brake mode to a mode simulating a second braking-force distribution of the parking brake, and a switch-back to the first braking-force distribution of the service brake mode is enabled at least during the transition.

15 Claims, 2 Drawing Sheets

METHOD FOR STABILIZING A MOTOR VEHICLE WHOSE SPEED IS REDUCED TO A REST POSITION AND BRAKE SYSTEM FOR CARRYING OUT SAID METHOD

CROSS-REFERENCE TO RELATED APPLICATIONS

This application is a continuation of International Application No. PCT/EP2004/012153 filed Oct. 27, 2004, the disclosures of which are incorporated herein by reference, and which claimed priority to German Patent Application No. 103 51 025.7 filed Oct. 31, 2003, the disclosures of which are incorporated herein by reference.

BACKGROUND OF THE INVENTION

The present invention relates to a method for stabilising a motor vehicle which is decelerated into a rest position and is provided with a service brake and a parking brake which can be actuated independently of the driver, and to a corresponding motor vehicle brake system.

It is already known to provide motor vehicle brake systems with a service brake and a parking brake which can be actuated independently of the driver. For example, EP 0 825 081 B1, and corresponding U.S. Pat. No. 6,019,436 A1, both of which are incorporated by reference herein, describes a brake system of this kind in which the service brake is actuated hydraulically and the parking brake is actuated electromechanically. This means that in a service brake mode, for example when the vehicle is decelerated when travelling, the individual wheels of the vehicle are decelerated by braking devices which are associated with these wheels and can be hydraulically actuated. If, however, the vehicle is parked, i.e. changed over from the service brake mode to a parking brake mode, the parking brake is activated electromechanically, in particular via a self-locking mechanism, and maintained in this parking brake mode until the parking brake mode is actively released. EP 0 825 081 B1 proposes, in the case of a brake system of this kind, that the transition from the service brake mode to the parking brake mode not take place until the braking force which is applied by the parking brake has reached the braking force which is applied by the service brake. It is to be noted in this respect that, where conventional brake systems of this kind are concerned, the parking brake only brakes the rear vehicle wheels, the front vehicle wheels being released unbraked, whereas the service brake acts on all vehicle wheels, that is also on the front wheels. This results in the possibility of complications when there is a transition from the service brake mode to the parking brake mode, in particular when, for example, the roadway surface does not offer sufficient grip in the region of the rear wheels or when, on account of considerable loading or a large trailer load attached to the vehicle, it is impossible to apply sufficiently high braking forces solely through the rear axle in order to hold the vehicle in situ. These problems in the transition from service brake mode to parking brake mode may result in the vehicle sliding or rolling away unnoticed.

BRIEF SUMMARY OF THE INVENTION

In contrast to this, the object of the present invention is to provide a method for stabilising a motor vehicle which is decelerated into a rest position and a corresponding brake system for the motor vehicle which guarantee a more reliable transition from the service brake mode to the parking brake mode.

This object is achieved by a method for stabilising a motor vehicle which is decelerated into a rest position and by a corresponding brake system which is provided with a service brake and a parking brake which can be actuated independently of the driver, wherein, when activation of the parking brake is initiated, the service brake changes from a first braking-force distribution of a service brake mode to a mode simulating a second braking-force distribution of the parking brake, and a switch-back to the first braking-force distribution of the service brake mode is enabled at least during the transition.

In other words, this means that, according to the present invention, the service brake simulates the parking brake mode before an actual transition to this parking brake mode. The driver therefore senses whether the braking forces which are available in the parking brake mode are sufficiently high to hold the vehicle in the desired position. If the vehicle remains in the desired position, the driver will make no changes to the braking state, which means that he will park the vehicle in the manner to which he is accustomed. As the driver makes no changes to the braking state, a transition from the service brake mode via the mode simulating the braking-force distribution of the parking brake to the parking brake mode takes place. On the other hand, if the basic conditions are such that, during the mode simulating the braking-force distribution of the parking brake, an undesirable movement of the vehicle occurs, for example because the roadway does not offer sufficient grip in the region of the wheels braked during the parking brake mode or because the loading or trailer load of the vehicle is too great to hold the vehicle immobile solely with the wheels braked in the parking brake mode, the driver senses this immediately during the mode simulating the braking-force distribution of the parking brake and can react accordingly. A reaction of this kind results, for example, in the brake pedal being depressed again and therefore a corresponding increase in the braking force in the context of the service brake mode, also called "switching-back" in the following, so that re-activation of the parking brake can be initiated while passing through the transition phase, although at a higher braking force level. The invention can therefore prevent undesirable movements of the vehicle which surprise the driver following a transition to the parking brake mode.

According to one development of the invention, the braking force is automatically transferred from the service brake to the parking brake of the vehicle when no switch-back takes place. In other words, this means that, when the driver notices an undesirable movement of the vehicle in the mode simulating the braking-force distribution of the parking brake, he also does not actuate the service brake again—by depressing the brake pedal—and therefore parks the vehicle in the usual way. According to the invention, this kind of automatic transfer of the braking force from the service brake to the parking brake of the vehicle can take place, for example, after a predetermined time interval. In other words, this means that the switch-back to the service brake mode is enabled within a predetermined time interval.

It is in this respect also possible for the service brake to change to the mode simulating the parking brake at the beginning of the time interval. As regards the distribution of the braking force to individual wheels of the vehicle, according to one embodiment of the invention, in the mode simulating the parking brake, the service brake distributes a braking force of the service brake acting on the wheels of at least two vehicle axles to selected wheels, in particular to the wheels of one vehicle axle or to the wheels disposed on one and the same vehicle side. It is thus possible to implement the parking brake function by applying a braking force to different wheels, for example also in accordance with environmental conditions. If, for example, rotational speed sensor output signals or a wheel slip detection device indicate(s) that one or more wheels are sliding away on the roadway surface, for example because this is icy, the braking force which is required to implement the parking brake function can be applied according to the situation to those wheels which have sufficient road grip.

According to one development of the invention, a holding force of the parking brake is additionally built up in the period during which the service brake is in the mode simulating the braking-force distribution of the parking brake. This may take place, for example, towards the end of the period during which the service brake changes to the mode simulating the braking-force distribution of the parking brake. It is also possible in this connection for the holding force of the parking brake to be built up until a second instant at the end of the period.

As regards the change in the braking force at individual vehicle wheels, according to one development of the invention relating to the automatic braking-force distribution, the braking force of the service brake is steadily reduced at a front vehicle axle and built up at selected wheels, in particular at wheels of a rear vehicle axle, until the braking-force distribution of the parking brake is attained. It is also possible in this connection for the entire braking force of the service brake to be transferred to the holding force of the parking brake following the second instant of the time interval. It is thereby possible to guarantee a sufficiently high holding force in the parking brake mode to guarantee a reliable parking brake mode.

If the parking brake mode is terminated again, for example after putting the vehicle into operation again, the parking brake can be directly released upon starting the motor vehicle without the service brake changing to the mode simulating the parking brake. This means that the transition which is executed upon activating the parking brake mode via the mode simulating the braking-force distribution of the parking brake is not carried out when the parking brake is released, as it is also not required when the parking brake is released. When releasing the parking brake, the driver will usually provide sufficient drive forces merely by actuating the accelerator pedal and optionally with a slipping clutch to prevent the vehicle from rolling back in an undesirable manner. The driver will alternatively activate the service brake when releasing the parking brake, with a braking force or holding force being exerted in all the vehicle wheels via the service brake.

The invention is also applicable in the case of a starting aid, i.e. the case in which, after the service brake has been actuated once for stopping on an upgrade, the vehicle automatically recognises this operating state and controls the service brake such that it holds the vehicle on the upgrade without the brake pedal having to be permanently actuated. This is also called a "hillhold" function. This braking mode of the starting aid or "hillhold" function is as a rule limited in time to several seconds, with an automatic reduction in the braking force or holding force in the service brake at the end of the predetermined time. According to one development of the invention in this connection, when there is a starting aid in the drive train of the motor vehicle with a change-speed gearbox, the transfer of the holding force of the parking brake to the braking force of the service brake when starting the motor vehicle takes place in a sequence which is the reverse of that when stopping. This means that the service brake also changes to the mode simulating the braking-force distribution of the parking brake during the starting aid or "hillhold" mode. It is also to be noted that the braking forces or holding forces in the starting aid mode are also accordingly reduced to zero when the driver again moves off with the vehicle.

According to one development of the invention, the stability control of the parking brake and/or of the service brake is integrated into a stability system of the vehicle. An integral solution of this kind enables the invention to be implemented in a relatively simple manner by using the control of the stability system.

In addition, according to one embodiment of the invention, the parking brake of the vehicle is actuated electromechanically.

Other advantages of this invention will become apparent to those skilled in the art from the following detailed description of the preferred embodiments, when read in light of the accompanying drawings.

DETAILED DESCRIPTION OF THE INVENTION

Figure 1:
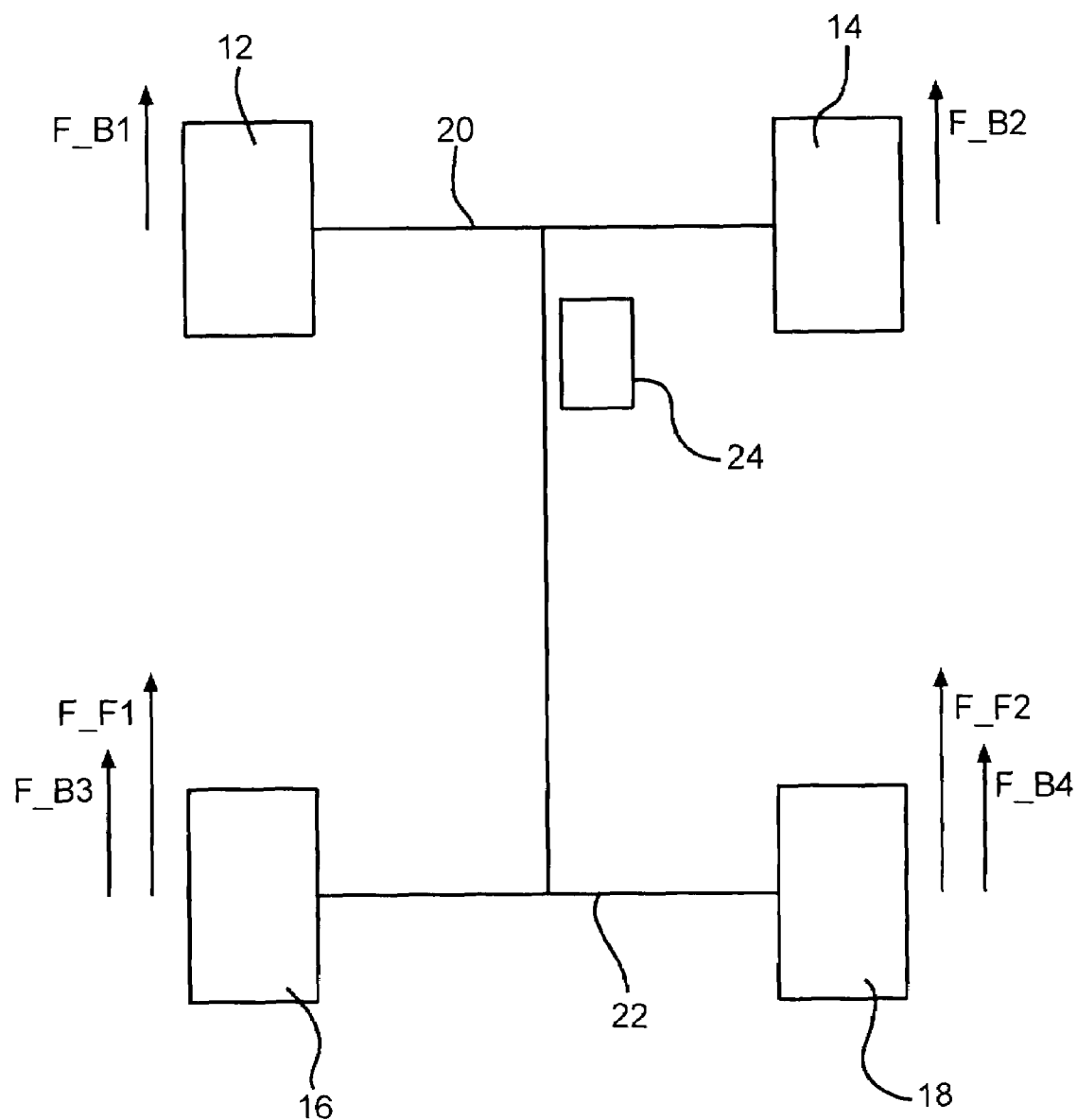
FIG. 1 is a schematic representation of the wheels of a motor vehicle.

FIG. 1 shows a schematically represented motor vehicle which is generally designated by 10. This comprises four wheels, namely the two front wheels 12 and 14 and the two rear wheels 16 and 18.

The two front wheels 12 and 14 are coupled via a front axle 20, while the two rear wheels are coupled via a rear axle 22. A service brake, the control of which is generally designated by 24, acts on all four wheels 12, 14, 16 and 18. In the service brake mode the service braking force F_B1 acts on the front wheel 12, the service braking force F_B2 on the front wheel 14, the service braking force F_B3 on the rear wheel 16 and the service braking force F_B4 on the rear wheel 18. However in the parking brake mode, for example when the vehicle has been parked, in the example holding forces only act on the two rear wheels 16 and 18, namely the holding force F_F1 on the rear wheel 16 and the holding force F_F2 on the rear wheel 18. These holding forces are applied by the parking brake.

Figure 2A:
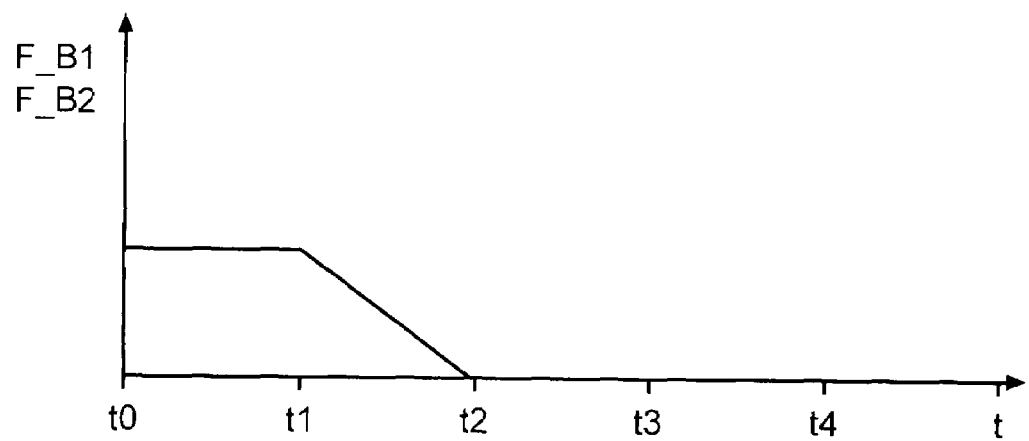
FIGS. 2a to 2c are various force-time diagrams relating to the braking or holding forces acting on the individual motor vehicle wheels.
Figure 2B:
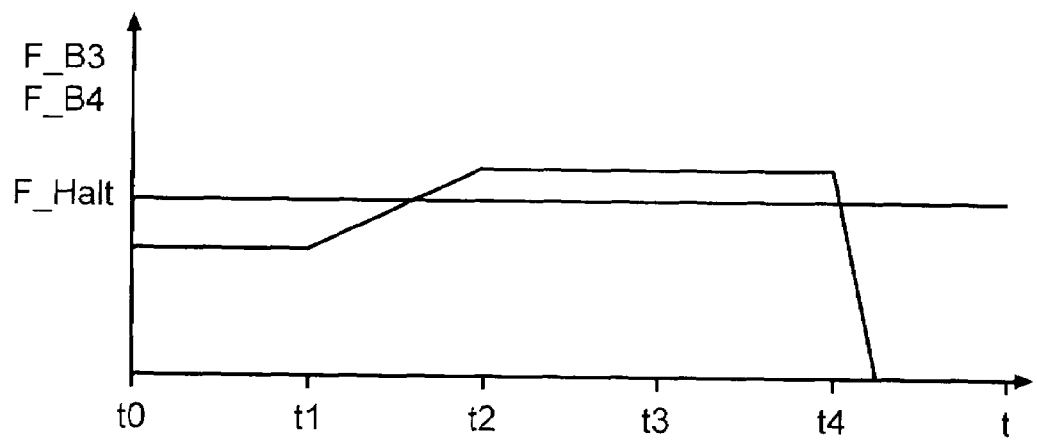
Figure 2C:
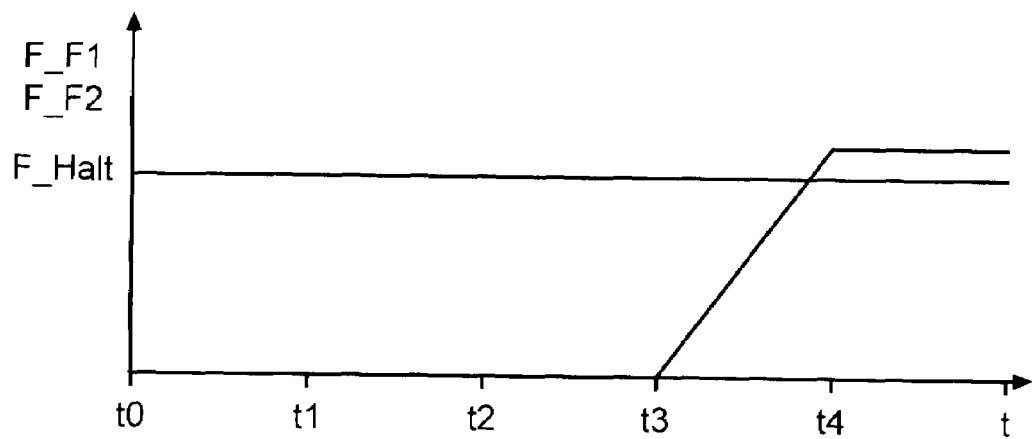

The interaction of the service brake and the parking brake according to the invention is described in the following with reference to FIG. 2. In this respect FIG. 2a shows the braking force trend at the front wheels when changing from the service brake mode via the mode of the service brake simulating the parking brake to the parking brake mode. FIG. 2b shows the trend of the braking forces applied by the service brake at the rear wheels 16 and 18 when changing from the service brake mode via the mode of the service brake simulating the parking brake to the parking brake mode. FIG. 2c shows the trend of the holding forces applied by the parking brake during the transition to the parking brake mode.

In the illustrated embodiment approximately equal braking forces exist at the front wheels 12, 14 and at the rear wheels 16, 18 at the instant t0. The brake system of the vehicle 10 is in a service brake mode, i.e. the vehicle is decelerated from a speed, for example, and comes to a standstill on an upgrade. The total braking force F_BGES at the vehicle is therefore composed of the individual braking forces acting on the wheels 12 to 18. This means:

$$F\_BGES(t0)=F\_B1(t0)+F\_B2(t0)+F\_B3(t0)=F\_B4(t0)$$

A change from the service brake mode to the parking brake mode is initiated at the instant t1. This means that the driver activates the parking brake, for example by actuating a level, pedal or button, or that the vehicle automatically activates the parking brake, for example on account of the starting aid or "hillhold" function being activated.

However before the parking brake is actually activated, the braking force or holding force at the front wheels 12 and 14 is reduced at the instant t1 to the instant t2, as shown in FIG. 2a. In parallel with this the braking force or holding force is increased at the rear wheels 16 and 18 to a value which is higher than the holding force required to stabilise the vehicle.

The required holding force F_Halt is the force which the parking brake system must at least apply in order to reliably hold the motor vehicle at a standstill. It depends, inter alia, on the inclination of the roadway on which the motor vehicle is located, on the loading state of the motor vehicle and on the brake temperature. At the instant t2 it is therefore only the rear wheels 16 and 18 which are braked via the service brake, which is controlled hydraulically in the example, with a braking force which is greater than the braking force required at least to guarantee a standstill state of the vehicle.

This state of the braking force which is only applied to the rear wheels via the service brake of the vehicle is subsequently maintained from the instant t2 via an instant t3 to an instant t4. The driver of the vehicle has sufficient time in the period between t2 and t4 to notice—subconsciously—whether the parking brake function which is brought about by the brake system via the service brake, i.e. simulated by the service brake, is sufficient to ensure that the vehicle is at a standstill in the selected position. The period from t2 to t4 therefore has to be sufficiently long to give the driver the opportunity of perceiving that the parking brake function is in working order. If the vehicle remains in its position on the roadway during the period between t2 and t4, i.e. no unintentional vehicle movement takes place, the driver will make no changes to the state. At the instant t3 the brake system of the vehicle then automatically begins to activate the parking brake and to increase the holding forces exerted on the rear wheels via the parking brake to the same level as those exerted on the rear wheels by the service brake in the period between t2 and t4. At the instant t4 the parking brake reaches the braking forces F_F1 and F_F2, which in terms of magnitude are equal to the braking forces F_B3 and F_B4 previously exerted via the service brake at the instant t3. This means that the parking brake now actually applies a sufficient braking or holding force to guarantee a standstill state of the vehicle, without any undesirable movement of the vehicle. The following therefore applies:

$$F\_F1(t4)+F\_F2(t4)=F\_B3(t3)+F\_B4(t3)==F\_B1(t1)+F\_B2(t1)+F\_B3(t1)+F\_B4(t1)$$

The service brake can then be de-activated at the instant t4 and thereafter, for example by reducing the hydraulic pressure inside the service brake system. The parking brake subsequently holds the vehicle in its standstill state, as is usual in the case of conventional parking brakes.

If, however, an undesirable vehicle movement occurs in the period between t2 and t4, for example because the roadway surface does not offer sufficient grip in the region of the braked rear wheels or because the vehicle loading or a trailer load is too great to apply the required braking forces solely via the rear wheels of the vehicle, the driver will increase the braking force which is applied via the service brake after he has initiated activation of the parking brake function at the instant t1, for example by again depressing the brake pedal. This may result in the actuation of the parking brake function being discontinued and having to be activated again—for example at a higher braking force level—by again actuating an initiating device. In any case it is possible to avoid surprising the driver by an insufficient action of the parking brake or even the occurrence of an accident on account of an insufficient parking brake function through the simulation described above of the parking brake mode by means of the service brake in the period between t2 and t4.

It is to be noted that the above description of the preferred embodiment is based on the parking brake function only being achieved by applying a braking force at the rear wheels of the vehicle. However it is equally possible within the scope of the invention to implement the parking brake function by specifically selecting different wheels, for example just the wheels at the front axle of the vehicle or two wheels located on one and the same vehicle side or one or several wheels which have the best road grip.

It is equally possible within the scope of the invention for the various steps of the method according to the invention which is discussed above with reference to FIG. 2 also to be initiated when a so-called starting aid or "hillhold" function which automatically activates the parking brake function is executed in the motor vehicle, although the initiating device provided for this has not been actively actuated by the driver. The method according to the invention can also be employed in a case of this kind.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Method for stabilising a motor vehicle which is decelerated into a rest position and is provided with a service brake and a parking brake which can be actuated independently of the driver, the method comprising the steps of:
   (a) activating the vehicle service brake to establish a first braking-force distribution of a service brake mode;
   (b) initiating activation of the parking brake, whereupon the service brake transitions from the first braking-force distribution of the service brake mode to a second braking-force distribution that simulates a parking brake mode; and
   (c) allowing a switch-back of the service brake to the first braking-force distribution at least during the transition of the service brake from the service brake mode to the parking brake mode upon determination that the second braking force distribution is not sufficient to hold the vehicle in a standstill state.

2. Method according to claim 1, wherein the braking force is automatically transferred from the service brake to the parking brake of the vehicle when no switch-back takes place.

3. Method according to claim 2, wherein the switch-back to the first braking force distribution of the service brake mode is enabled within a first predetermined time period.

4. Method according to claim 3, wherein the service brake changes to the mode simulating the parking brake during a first portion of the first time interval.

5. Method according to claim 4, wherein, in the mode simulating the parking brake, the service brake distributes a braking force of the service brake acting on the wheels of at least two vehicle axles to the wheels disposed on one and the same vehicle side.

6. Method according to claim 4, wherein, in the mode simulating the parking brake, the service brake distributes a braking force of the service brake acting on the wheels of at least two vehicle axles to selected wheels of one vehicle axle.

7. Method according to claim 6, wherein a holding force of the parking brake is additionally built up in a second time period during which the service brake is in the mode simulating the braking-force distribution of the parking brake.

8. Method according to claim 7, wherein the holding force of the parking brake is built up until the end of the second time period.

9. Method according to claim 8, wherein, in relation to the transition of the braking-force distribution, the braking force of the service brake is steadily reduced at a front vehicle axle and built up at selected wheels of a rear vehicle axle, until the braking-force distribution of the parking brake is attained.

10. Method according to claim 9, wherein the entire braking force of the service brake is transferred to the holding force of the parking brake after the end of the second time period.

11. Method according to claim 10, wherein the parking brake is directly released upon starting the motor vehicle without the service brake changing to the mode simulating the parking brake.

12. Method according to claim 10, wherein the motor vehicle includes a change-speed gearbox and further wherein the drive train of the motor vehicle includes a hill-hold function that, upon starting the motor vehicle on an upgrade, transfers the holding force of the parking brake to the braking force of the service brake in a sequence that is the reverse of that of an activation of the parking brake.

13. Method according to claim 10, wherein the stabilizing of the vehicle by means of the parking brake and the service brake is done with a stability control which is integrated into a stability system of the vehicle.

14. Method according to claim 10, wherein the parking brake of the vehicle is actuated electromechanically.

15. Brake system for a vehicle comprising:
- a service brake which can be actuated independently of the driver:
- a parking brake which can be actuated independently of the driver; and
- a brake controller that is operable upon activation of the parking brake to transition the service brake from a first braking-force distribution of a service brake mode to a second braking-force distribution that simulates a parking brake mode, the brake controller being further operable to allow a switch-back of the service brake to the first braking-force distribution of the service brake mode at least during the transition of the service brake from the service brake mode to the parking brake mode upon determination that the second braking force distribution is not sufficient to hold the vehicle in a standstill state.

* * * * *